United States Patent
Hadidi et al.

(10) Patent No.: US 9,206,085 B2
(45) Date of Patent: *Dec. 8, 2015

(54) METHOD FOR DENSIFICATION AND SPHEROIDIZATION OF SOLID AND SOLUTION PRECURSOR DROPLETS OF MATERIALS USING MICROWAVE GENERATED PLASMA PROCESSING

(71) Applicant: AMASTAN TECHNOLOGIES LLC, North Andover, MA (US)

(72) Inventors: Kamal Hadidi, Somerville, MA (US); Makhlouf Redjdal, Stoneham, MA (US)

(73) Assignee: AMASTAN TECHNOLOGIES LLC, North Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/281,295

(22) Filed: May 19, 2014

(65) Prior Publication Data
US 2014/0342093 A1   Nov. 20, 2014

Related U.S. Application Data

(63) Continuation-in-part of application No. 13/675,541, filed on Nov. 13, 2012, now Pat. No. 9,023,259.

(51) Int. Cl.
| | |
|---|---|
| *H05H 1/30* | (2006.01) |
| *C04B 35/628* | (2006.01) |
| *C23C 4/12* | (2006.01) |
| *C04B 35/626* | (2006.01) |

(52) U.S. Cl.
CPC ..... *C04B 35/62884* (2013.01); *C04B 35/62665* (2013.01); *C23C 4/127* (2013.01); *H05H 1/30* (2013.01); *B01J 2219/0898* (2013.01)

(58) Field of Classification Search
None
See application file for complete search history.

(56) References Cited

U.S. PATENT DOCUMENTS

| | | | |
|---|---|---|---|
| 4,076,640 | A | 2/1978 | Forgensi et al. |
| 5,958,361 | A | 9/1999 | Laine et al. |
| 5,989,648 | A * | 11/1999 | Phillips .................. 427/456 |
| 6,261,484 | B1 | 7/2001 | Phillips et al. |
| 6,274,110 | B1 | 8/2001 | Kim et al. |
| 6,543,380 | B1 | 4/2003 | Sung-Spitzl |
| 6,569,397 | B1 | 5/2003 | Yadav et al. |
| 6,652,822 | B2 | 11/2003 | Phillips et al. |

(Continued)

OTHER PUBLICATIONS

Boulos, M. I., "The inductively coupled radio frequency plasma." Journal of High Temperature Material Process, 1997, vol. 1, pp. 17-39.

(Continued)

*Primary Examiner* — Mary F Theisen
(74) *Attorney, Agent, or Firm* — McCarter & English, LLP; Deborah M. Vernon

(57) ABSTRACT

A method for processing feed material to produce dense and spheroidal products is described. The feed material is comprised of powder particles from the spray-drying technique or solution precursor droplets from ceramic or metallic materials. The feed material is processed using plasma generated from a microwave. The microwave plasma torch employed is capable of generating laminar flow during processing which allows for the production of spheroidal particles with a homogenous materials distribution. This results in products having improved thermal properties, improved corrosion and wear resistance and a higher tolerance to interface stresses.

26 Claims, 13 Drawing Sheets

(56) References Cited

U.S. PATENT DOCUMENTS

| | | |
|---|---|---|
| 6,902,745 B2 | 6/2005 | Lee et al. |
| 6,919,527 B2 | 7/2005 | Boulos et al. |
| 7,125,537 B2 | 10/2006 | Liao et al. |
| 7,175,786 B2 | 2/2007 | Celikkaya et al. |
| 7,182,929 B1 | 2/2007 | Singhal et al. |
| 7,220,398 B2 | 5/2007 | Sutorik et al. |
| 7,374,704 B2 | 5/2008 | Che et al. |
| 7,629,553 B2 | 12/2009 | Fanson et al. |
| 7,700,152 B2 | 4/2010 | Laine et al. |
| 7,931,836 B2 * | 4/2011 | Xie et al. .................. 264/15 |
| 8,211,388 B2 | 7/2012 | Woodfield et al. |
| 8,268,230 B2 | 9/2012 | Cherepy et al. |
| 8,329,090 B2 | 12/2012 | Hollingsworth et al. |
| 2002/0112794 A1 | 8/2002 | Sethuram et al. |
| 2004/0009118 A1 | 1/2004 | Phillips et al. |
| 2004/0045807 A1 * | 3/2004 | Sarkas et al. .................. 204/164 |
| 2004/0183008 A1 | 9/2004 | Wiseman |
| 2005/0025698 A1 | 2/2005 | Talbot et al. |
| 2005/0163696 A1 | 7/2005 | Uhm et al. |
| 2005/0242070 A1 | 11/2005 | Hammer |
| 2006/0145124 A1 | 7/2006 | Hsiao et al. |
| 2007/0075052 A1 | 4/2007 | Fanson et al. |
| 2007/0130656 A1 | 6/2007 | Boulos et al. |
| 2007/0259768 A1 | 11/2007 | Kear et al. |
| 2008/0006954 A1 | 1/2008 | Yubuta et al. |
| 2008/0173641 A1 | 7/2008 | Hadidi et al. |
| 2009/0074655 A1 | 3/2009 | Suciu |
| 2009/0093553 A1 * | 4/2009 | Kleine Jager et al. .......... 516/33 |
| 2010/0176524 A1 | 7/2010 | Burgess et al. |
| 2012/0294919 A1 * | 11/2012 | Jaynes et al. .................. 424/404 |
| 2012/0322645 A1 | 12/2012 | Jordan et al. |
| 2013/0270261 A1 | 10/2013 | Hadidi et al. |
| 2014/0155249 A1 | 6/2014 | Hadidi et al. |
| 2014/0217630 A1 | 8/2014 | Redjdal et al. |

OTHER PUBLICATIONS

Laine, R. M. et al., "Making nanosized oxide powders from precursors by flame spray pyrolysis." Key Engineering Materials (1999), v 159-160, p. 17-24.

Muoto, C. et al., "Phase Homogeneity in $Y_2O_3$—MgO Nanocomposites Synthesized by Thermal Decomposition of Nitrate Precursors with Ammonium Acetate Additions" J. Am. Ceram. Soc., 94[12] 4207-4217.

Veith et al., "Low temperature synthesis of nanocrystalline $Y_3Al_5O_{12}$ (YAG) and Ce doped $Y_3Al_5O_{12}$ via different sol-gel methods." J. Mater Chem, (1999) 9: 3069-3079.

\* cited by examiner

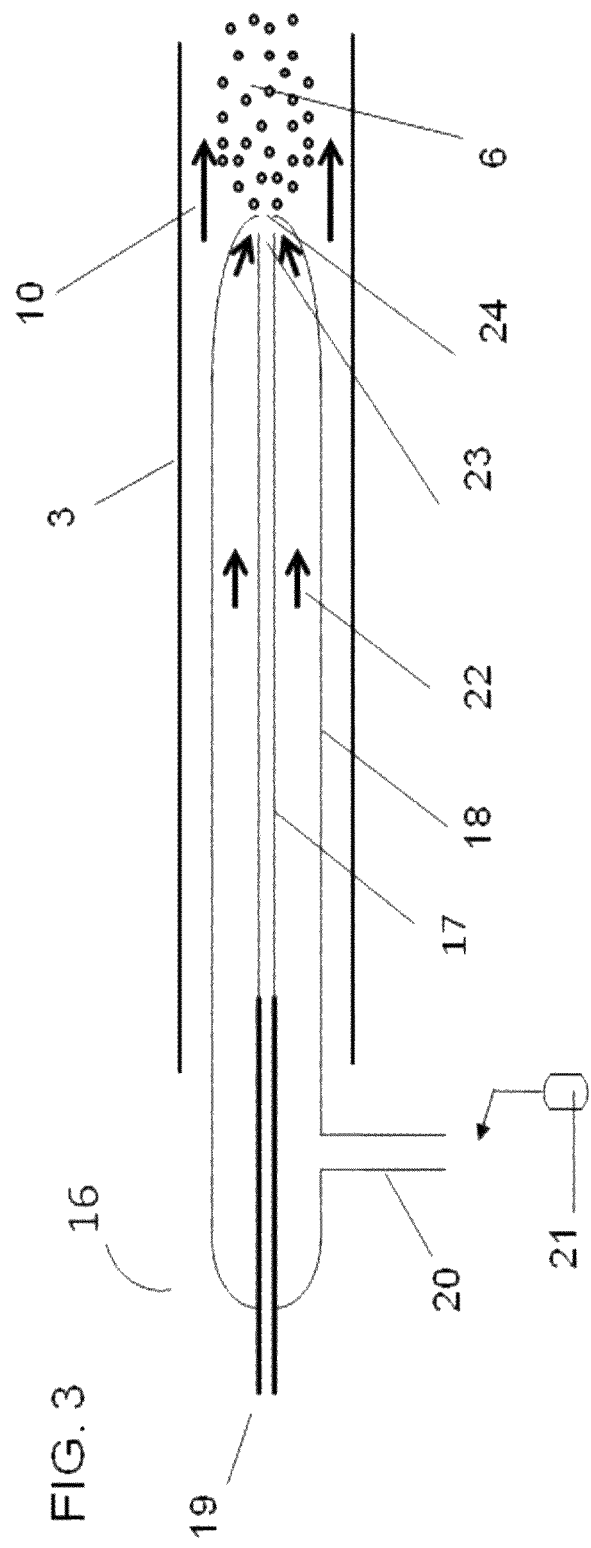

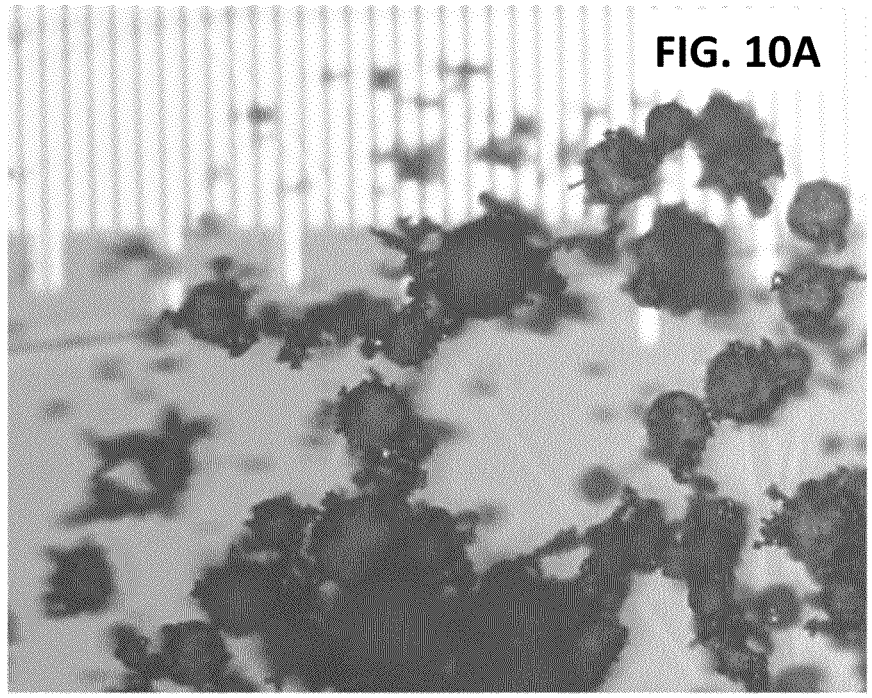
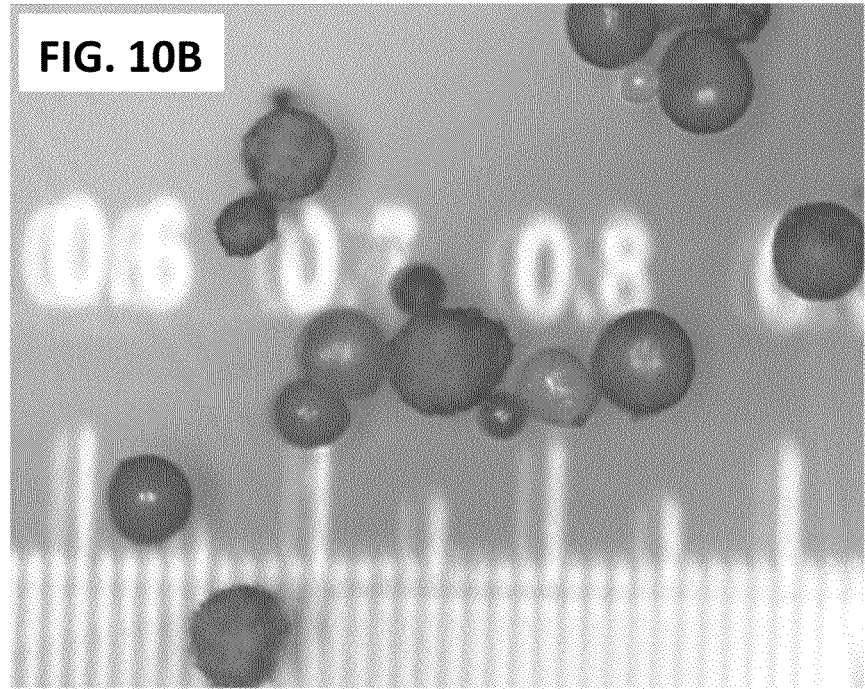

METHOD FOR DENSIFICATION AND SPHEROIDIZATION OF SOLID AND SOLUTION PRECURSOR DROPLETS OF MATERIALS USING MICROWAVE GENERATED PLASMA PROCESSING

CROSS-REFERENCE TO RELATED APPLICATION

The present application is a continuation-in-part of U.S. patent application Ser. No. 13/675,541 filed on Nov. 13, 2012, which published as U.S. Publication No. 2014/0131906 on May 15, 2014.

TECHNICAL FIELD

The present invention is generally directed to a method for taking feed material and processing the feed material to produce dense and spheroidal products. The feed material is comprised of powder particles from the spray-drying technique or solution precursor droplets containing ceramic or metallic materials. More particularly, the present invention is directed to a method which uses a microwave plasma torch capable of generating a laminar flow pattern during materials processing to produce dense and spheroidal products. The laminar flow in an axisymmetric hot zone with a uniform temperature profile within the torch allows for the production of uniform spheroidal particles with a homogenous materials distribution, which leads to final products possessing superior characteristics.

BACKGROUND OF THE INVENTION

One of the most important aspects of preparing industrial powders is the spheroidization process, which transforms powders produced by spray drying and sintering techniques, or angular powders produced by conventional crushing methods, into spheres. Spheroidized particles are more homogenous in shape, denser, much less porous, provide higher flowability, and possess lower friability. These characteristics make for powders that are superior for applications such as injection molding, thermal spraying of coatings and provide parts having near net shapes.

Current spheroidization methods employ thermal arc plasma described in U.S. Pat. No. 4,076,640 issued Feb. 28, 1978 and radio-frequency generated plasma described in U.S. Pat. No. 6,919,527 issued Jul. 19, 2005. However, these two methods present limitations which result from the characteristics of the radio-frequency plasma and the thermal arc plasma.

In the case of thermal arc plasma, an electric arc is produced between two electrodes and is then blown out of the plasma channel using plasma gas. Powder is then injected from the side, perpendicular or at an angle, into the plasma plume, where it gets exposed to the high temperature of the plasma and is collected as spheres in filters during subsequent processing. An issue with thermal arc plasma is that the high temperature of the electrodes leads to erosion of the electrodes, which leads to contamination of the plasma plume with the electrode material, resulting in the contamination of the powders to be processed. In addition, the thermal arc plasma plume has an inherently uneven temperature gradient, and by injecting powder into the plasma plume from the side, the powder gets exposed to an uneven temperature gradient that leads to the production of particles that are not homogenous in size, density or porosity.

In the case of radio frequency plasma spheroidization, the plasma is produced in a dielectric cylinder by induction at atmospheric pressure. Radio frequency plasmas are known to have low coupling efficiency of the radio frequency energy into the plasma and a lower plasma temperature compared to arc and microwave generated plasmas. The magnetic field responsible for generating the plasma in radio-frequency plasma is non-uniform in profile which leads to an uneven temperature gradient and thus a non-homogenous thermal treatment of the particles. This leads to non-homogeneity in size, microstructure, and density or porosity of the final product.

Thus there is a need to provide a homogenous and uniform high temperature thermal path for all the feed materials processed which results in high purity, contamination-free, and homogenous spherical particles. However, no such method has been reported.

From the above, it is therefore seen that there exists a need in the art to overcome the deficiencies and limitations described herein and above.

SUMMARY OF THE INVENTION

The shortcomings of the prior art are overcome and additional advantages are provided through the use of a microwave generated plasma torch apparatus that is capable of producing laminar flow patterns to spheroidize and densify geometrically non-uniform powder particles and solution precursor droplets of ceramic materials.

In accordance with one embodiment of the present invention a pressurized powder feeder is used to axially inject powder particles into a plasma chamber where the powder particles are entrained in a laminar gas flow pattern and undergo uniform heat treatment by being exposed to a uniform temperature profile within the microwave generated plasma. This results in spheroidal pearl-like particles having uniform density.

In another embodiment of the present invention, a droplet maker or atomizer is used to inject solution precursor droplets which are entrained in a laminar gas flow pattern and undergo uniform heat treatment by being exposed to a uniform temperature profile within the microwave generated plasma to produce spheroidal pearl-like particles having uniform density.

Another feature of this invention is that it uses microwave generated plasma in accordance with U.S. patent application Ser. No. 13/445,947.

Therefore, an object of the present invention is to provide a laminar flow environment, free of turbulent flow effects, for the feed material that is processed with the microwave generated plasma, which results in dense and spheroidal particles having uniform sizes and shapes and characterized by a homogenous materials distribution.

It is another object of the present invention to enhance plasma processing of materials so as to provide a product with improved thermal properties, improved corrosion and wear resistance and a higher tolerance to interface stresses.

Additional features and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIG. 3 illustrates a method of atomizing droplets using a nebulizing apparatus;

FIGS. 10A and 10B illustrate densified and spheroidized blended alumina-titania and cobalt oxide ceramic particles, 10 to 50 micrometers in diameter after injection of corresponding blended spray dried powder;

DETAILED DESCRIPTION

Figure 1:
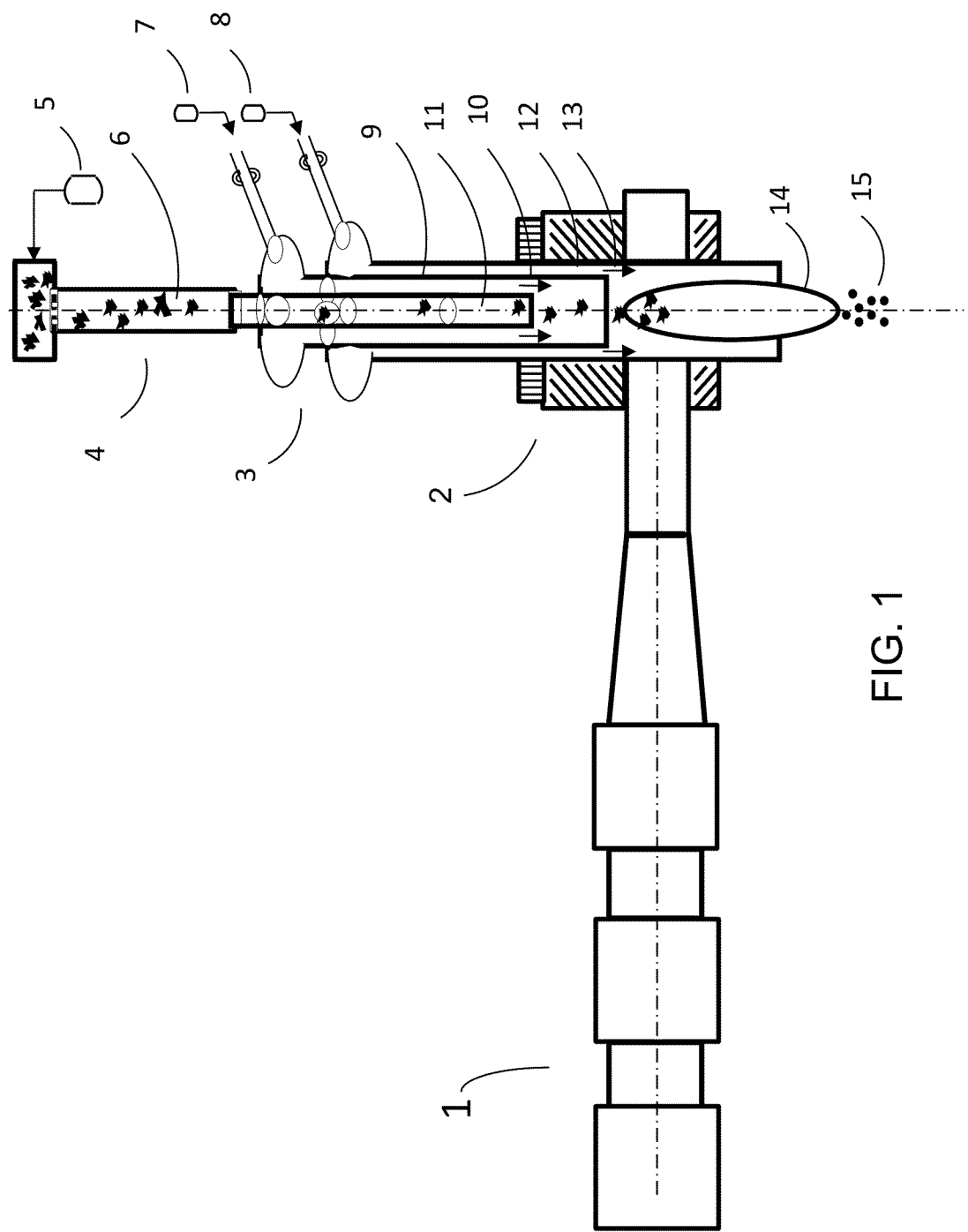
FIG. 1 illustrates a preferred embodiment of the apparatus used for making dense and spheroidized particles which uses the microwave generating source described in US Patent Application Publication 2008/0173641 A1, a dielectric plasma torch as described in U.S. patent application Ser. No. 13/445,947, and a materials feeder such as a powder feeder, or solution precursor reservoir which dispenses powder particles, or solution droplets, in accordance with the present invention.

Referring to FIG. 1, an apparatus to produce dense and spheroidal products which includes a microwave radiation generator 1, a plasma chamber 2, a dielectric sheathing plasma torch 3, and a powder feeder, or solution precursor injector, 4. The microwave radiation generator 1, described in US Patent Application Publication 2008/0173641 A1 is combined with plasma chamber 2 and plasma sheathing torch 3. Both 2 and 3 are described in U.S. patent application Ser. No. 13/445,947. The particle feeder 4 is an injection apparatus with a pressurized source 5 that can feed solid powder particles 6 into dielectric plasma torch 3. When powder injection is used, particles 6 may be a product of spray-drying techniques or other techniques. Alternatively, particles 6 may be droplets of solution precursor injected using an atomizer, or a droplet maker energized with a high frequency electrical drive. Pressurized sources 7 and 8 are used to introduce process gases as inputs into 3 to entrain and accelerate particles 6 along axis 11 towards plasma 14. First, particles 6 are accelerated by entrainment using core laminar gas flow 10 created through annular gap 9. Cooling laminar flow 13 created through annular gap 12, flows at not lower than 100 standard cubic feet per hour in the case of solid powder feed or atomized injection, and provides laminar sheathing for the inside wall of dielectric torch 3 to protect it from melting due to heat radiation from plasma 14. High flow is also needed to keep particles 6 from reaching the inner wall of 3 where plasma attachment could take place. Relatively lower gas flows are needed when using a droplet maker injector as the flow of particles is more uniform and follows axis 11 closely. Particles 6 are guided by laminar flows 10 and 13 towards microwave plasma 14 were they undergo homogeneous thermal treatment to become dense and spherical product particles 15. The densification and spheroidization of spray-dried ceramic solid particles 6, or of droplets of solution precursor materials, is achieved by choosing the appropriate experimental parameters capable of maintaining stable microwave generated plasma 14 to produce dense and spherical particles 15. These parameters are microwave power in 1, powder particles or solution precursor droplet injection flow rates along axis 11, carrier gas flow rates of laminar entrainment flow 10, laminar cooling flow 13 inside the dielectric sheathing torch 3, heating rates within plasma 15 and quenching rates not less than $10^{3}$° C./sec upon exit of plasma 15.

Figure 2A:
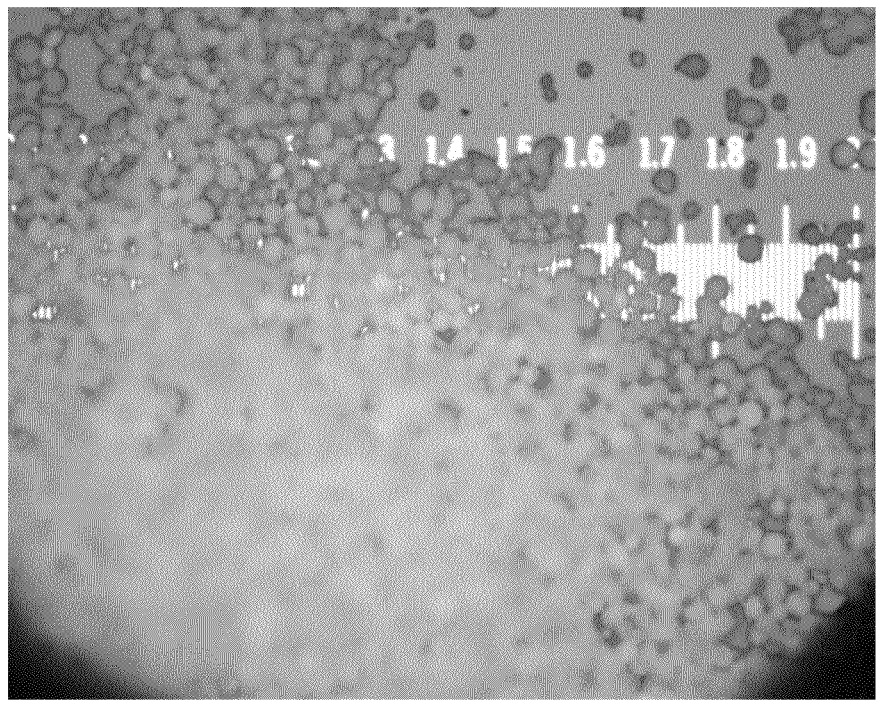
FIGS. 2A and 2B illustrate densified and spheroidized MgO—$Y_2O_3$ particles obtained by the microwave plasma process after injection of spray-dried powder.
Figure 2B:
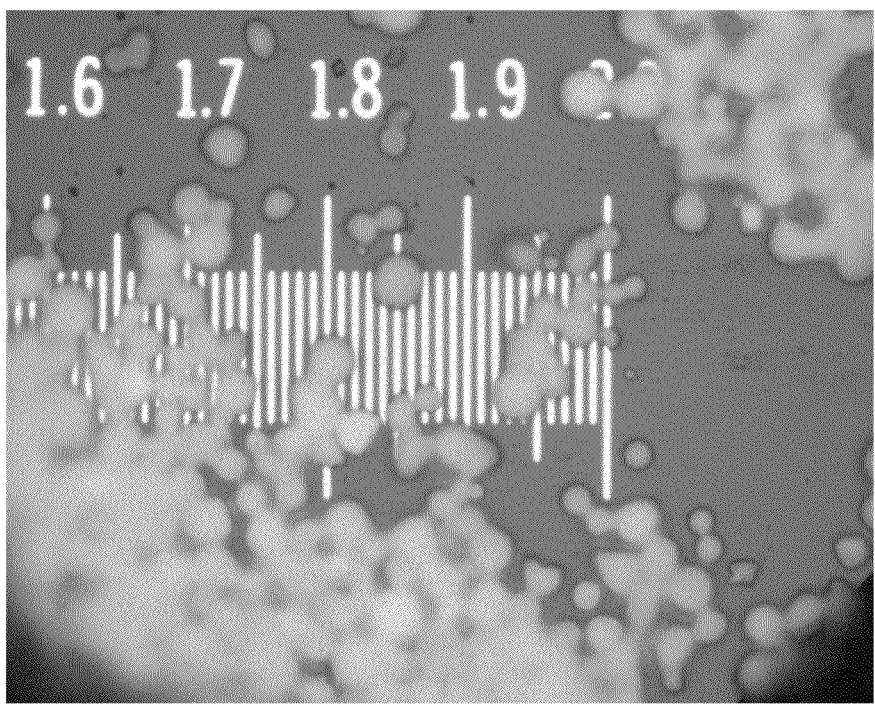

Referring to FIGS. 2A and 2B, this method has been applied to spheroidize particles 6 made of commercial Magnesia-Yttria (MgO—$Y_2O_3$) solid powder particles obtained by the spray-drying technique from the INFRAMAT Corporation. Particles 6, in the case of INFRAMAT powder, possess closed or semi-spherical morphology, low density, and are highly porous and brittle particles. The powder feeder 4, with a reservoir with low pressure gas flow (<20 PSI) from pressurized source 5, provides a fluidized bed for particles 6 which are driven by gas flow through powder feeder 4 towards the input of plasma torch 3. Particles 6 diameters initially ranged between 38 micrometers (μm) and 73 μm. The elimination of small particles prior to injection (particles with diameters less than 37 μm) reduces any recirculation of materials above the hot zone. The elimination of large particles (larger than 75 μm) reduces the diameter range of particle products that will be collected. Sieves with mesh size 400 (38 μm), and 200 (74 μm) have been used to accomplish this classification. Particles 6 are then entrained and accelerated along axis 11 by laminar gas flow 10 for a minimum distance of two (2) inches towards microwave plasma 14. Laminar flow 10 is crucial in constraining the flow paths of particles 6 to a cylindrical region as close as possible to axis 11. The penetration into plasma 14 is accomplished in such a manner that directional paths of particles 6 take place at the center of plasma 14 along axis 11. Particles 6 are again accelerated, in part, by a second laminar gas flow 13, over a minimum distance of three quarters of an inch before reaching the top of the plasma flame 14. The primary function of laminar flow 13 is to ensure adequate cooling of the dielectric tube sheath 3 that houses the plasma. Laminar flow 13 need to be high enough to span the remainder of the length of the outer tube of dielectric plasma torch 3. The processing medium that combines the axis-symmetric laminar gas flows 10 and 13, along with the uniform temperature profile of plasma 14, ensures that thermal processing of particles 6 is done volumetrically to yield the dense spherical products 15 shown in FIG. 2A. Two large ticks of the ruler in FIG. 2B correspond to 100 micrometers which demonstrates that particles 15 range in diameter from 15 micrometers to 50 micrometers. The densified and spheroidized particles 6 exhibit a "pearl" like texture and morphology.

Referring to FIG. 3, particles 6 are produced using a nebulizing apparatus 16 for solution precursor injection. Nebulizer 16 consists of two concentric quartz tubes 17 and 18 which are fused together. A solution precursor of 7YSZ, or any other weight concentration of Yttrium ranging from 3% to 20%, in a pressurized stainless steel tank is introduced at input 19 of tube 17. The solution precursor injection flow rate is in the order of 4 milliliters per minute and the gas tank pressure is about 20 pounds per square inch (PSI). The length of tube 18 is no smaller than 2 inches and does not exceed one foot. Through input tube 20, and pressurized gas source 21 pushes the atomizing gas flow 22 through an annular gap between concentric tubes 18 and 17 in nebulizer 16. The injected solution precursor exits through orifice 23 where it is atomized by gas flow 22, and exits at orifice 24 of tube 18 as an aerosol of droplet particles 6. The distance between orifice 23 and orifice 24 must not exceed 1 millimeter (mm). The end of tube 18 is tapered so that gas flow 22 enters the jet of solution precursor with an angle close to 90 degrees. Upon exit, particles 6 are entrained by laminar flow 10 in dielectric plasma torch 3, also seen in FIG. 1, and subsequently the particles reach the axis-symmetric thermal processing medium inside dielectric plasma torch 3 where they undergo volumetric heating in plasma 14.

Referring to FIG. 4 and FIG. 5, these illustrate densified and spheroidized 7YSZ product particles 15 by atomizing 7YSZ solution precursor using nebulizer 16. Particles 15 exhibit a "pearl" like texture and morphology. Particles 15 measure approximately between 20 micrometers (μm) and 53 micrometers (μm) in diameter as shown in FIG. 4 (20 to 38 μm), and FIG. 5 (38 to 53 μm) after post-classification with sieves having mesh sizes of 635 (20 μm), 400 (38 μm), and 270 (53 μm), respectively.

In yet another embodiment, a different feeder than a nebulizer can be used to produce atomized precursor droplets. In this case, a piezo driven droplet maker is used to generate a stream jet of uniform droplets of 8%-weight YSZ precursor which are then injected into the plasma hot zone of the microwave plasma apparatus described previously in FIG. 1. This droplet maker apparatus is described in patent application published under number WO 2014052833 A1. Referring to FIG. 6, spheroidized and densified 8YSZ product particles are produced with a size ranging from 15 to 35 micrometers as measured using an optical microscope. A scale of 50 micrometers is included in FIG. 6. These spheres are pearl like indicating the presence a smooth surface for spherical and dense particles thus enhancing the flowability of such powder.

In yet another embodiment, an entraining gas is added to the central feeding tube so as to entrain the powder particle matter into the plasma and control the powder particle matter velocity and residence time in the plasma. The entraining gas can be chosen to be compatible with the powder particle matter processing goal. For instance, if the material being processed needs to be kept from oxidizing or being reduced, then an inert gas such as argon can be chosen. If the material to be spheroidized is to be oxidized, then oxygen gas may be used, and if the material to be spheroidized is to be reduced, then hydrogen or ammonia can be used.

Referring to FIG. 7, a pressurized source 25 is used to introduce additional entrainment gas into tube inlet 26 in communication with exit nozzle 27 of powder feeder 4 containing feed particles 6 which are accelerated inside central tube 28 of plasma torch 3. The flow rate of injected gas 25 is determined according to the size and morphology of injected particle powders to optimize the melting conditions of these particles in the plasma zone. It is well known by those skilled in the art that additional gas 25 can be injected so that it is collinear with the direction of flow of feed particles 6 by an obvious change in the manner of communication of inlet 26 with powder feeder exit nozzle 27 and central tube 28 of plasma torch 3.

In yet another embodiment, passivation-inducing fluid is added into the process so as to passivate and/or coat the spheroidized powder. The passivation fluid can be either gaseous or atomized solution. Referring to FIG. 8, pressurized source 25 is used to introduce passivation fluid 29 in the form of a gas phase into inlet tube 26 in communication with exit nozzle feeder 27 of powder feeder 4 which contains feed particles 6. Referring to FIG. 8 again, the passivation materials 29 can be introduced as a mist using atomizing gas source 30 and nebulizer 31 into inlet tube 26 in communication with exit nozzle feeder 27 of powder feeder 4 which contains feed particles 6. The mixture of passivation material and feed particles travels together in central tube 28 towards the plasma zone where the passivation material chemically reacts with feed particles 6.

Referring to FIG. 8, the passivation-inducing fluid 32 can also be added through inlet tube 33 in communication with middle tube 34 of plasma torch 3. Passivation fluid 32 is introduced as gas using pressurized source 35 or as mist using a combination of atomizing gas 36 and nebulizer 37. The mixture of passivation material 32 and feed particles 6 are mixed together in the middle tube 34 at the outlet end of central tube 28 and entrained together towards the plasma zone where the passivation material chemically reacts 32 with feed particles 6.

In yet another embodiment, the passivation fluid is injected into the process through an additional injection port, located after the microwave injection port, i.e., downstream the plasma hot zone. In this situation, the powder is first spheroidized, and then exposed to the passivation fluid that can be in the form of a gas or atomized solution. The object of this invention is to provide means to produce core-shell like microstructure of spheroidized particle products. Referring to FIG. 9A. Passivation fluid material is injected as a gas phase or atomized droplets into inlet 38 inside plasma gas exhaust chamber 39 so that passivation fluid material is deposited on plasma processed particle 15 to produce coated particle 40. Passivation fluid material can be introduced as a gas or atomized droplets using the means described. A second tube inlet 41 and even a multitude of inlet tubes can be used to introduce the same passivation fluid material or a combination of different coating fluid materials. It is obvious for someone skilled in the art that the number of these inlets into exhaust chamber 39 can be increased to accommodate a composite mixture for the desired passivation or coating layer depending on the applications. Referring to FIG. 9B, a magnified passivated or coated particle 40 is shown with the spheroidized core 15 and shell-like passivation coating 42.

This method has been applied to spheroidize particles made of a blend of commercial alumina-titania and cobalt oxide powders shown in FIG. 10A. This blend consists of 80%-weight alumina-titania ($Al_2O_3$-$13TiO_2$) and 20%-weight cobalt oxide (CoO) agglomerated powder particles obtained by the spray-drying technique averaging 37 micrometers in diameter. The white graduated scale (ruler) in the background indicates 100 micrometers between two long graduated bars, while the distance is 10 micrometers between two consecutive small graduation bars. FIG. 10B shows spheroidized and densified product particles after processing through the microwave plasma. It can be seen that most of the product particles exhibit a pearl-like texture with a diameter size ranging between 10 and 50 microns.

The electrodeless microwave generated plasma can be used to purify a wide range of materials. Presence of electrodes to generate plasma, such as arc plasma processes, introduces impurities during in-flight melting of processed materials. Impurities are made of electrode material as the electrode wear out due to high operating temperatures of arc plasmas. Absence of electrodes to generate microwave plasma used in the present method eliminates contamination and provides for the production of high purity processed materials.

Figure 11:
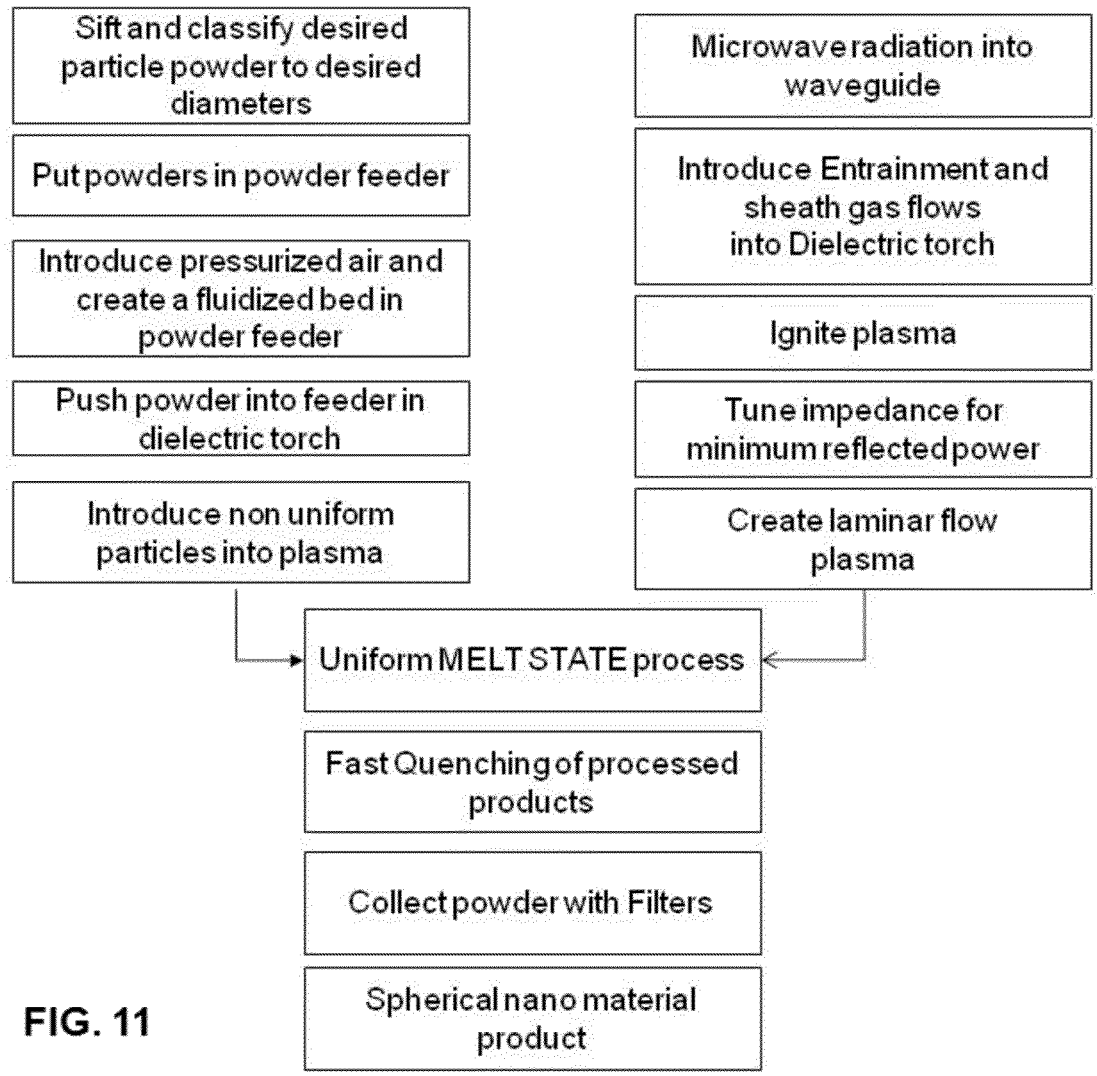
FIG. 11 illustrates a method of spheroidization by injection of solid powder using a powder feeder.

Referring to FIG. 11, the densified and spheroidized particles are made according to the procedure described therein. The powder particles to be processed are first sifted and classified according to their diameters, the minimum diameter is 20 μm and the maximum diameter is 74 μm. This eliminates recirculation of light particles above the hot zone of the plasma chamber and also ensures that the process energy present in the plasma is sufficient to melt the particles. This powder is then disposed in a powder feeder where a fluidized bed, in an internal chamber using a relatively low pressurized source of air not exceeding 20 pounds per square per inch (PSI), is introduced. For a better flow of the powder, the powder feeder is constantly shaken using a shaker energized by another pressurized source of air having a minimum pressure of 20 pounds per square per inch (PSI). The powder is carried from inside the powder feeder towards the input of the feeding tube of the dielectric plasma torch under pressure which permits a constant injection of particles into the plasma process. Prior to this, and referring to the right side of FIG. 11, microwave radiation is introduced into the waveguide towards the plasma chamber where the dielectric plasma torch is located, and placed perpendicularly to the waveguide. Two annular flows are introduced; one for entrainment of injected particles and the other flow protects the inner wall of the outer tube of the plasma torch from melting under the effect of the high heat from the plasma. Once both flows are in place, the plasma is ignited inside the dielectric plasma torch. An appropriate combination of entrainment and cooling flows are chosen to stabilize the plasma. In addition, these entrainment and cooling flows are chosen to allow smooth circulation of particles towards the plasma and avoid turbulence that could create recirculation and back flow of powders above the hot zone of the chamber. In addition these entrainment and cooling flows are chosen to minimize any non-uniformity in the thermal path in the outward radial direction away from axis 11. Once the particles reach the plasma now present in the hot zone, they are subjected to a uniform melt state characterized by a uniform thermal path for particles along with a uniform temperature profile of the plasma in the hot zone. The particles are processed volumetrically and uniformly and exit into an atmospheric fast quenching chamber below the exit nozzle of the plasma. The product upon solidification is collected in nylon or stainless steel filters, or quenched in distilled water in some applications, and analyzed for its microstructure and its mechanical, optical, and thermal properties.

Figure 12:
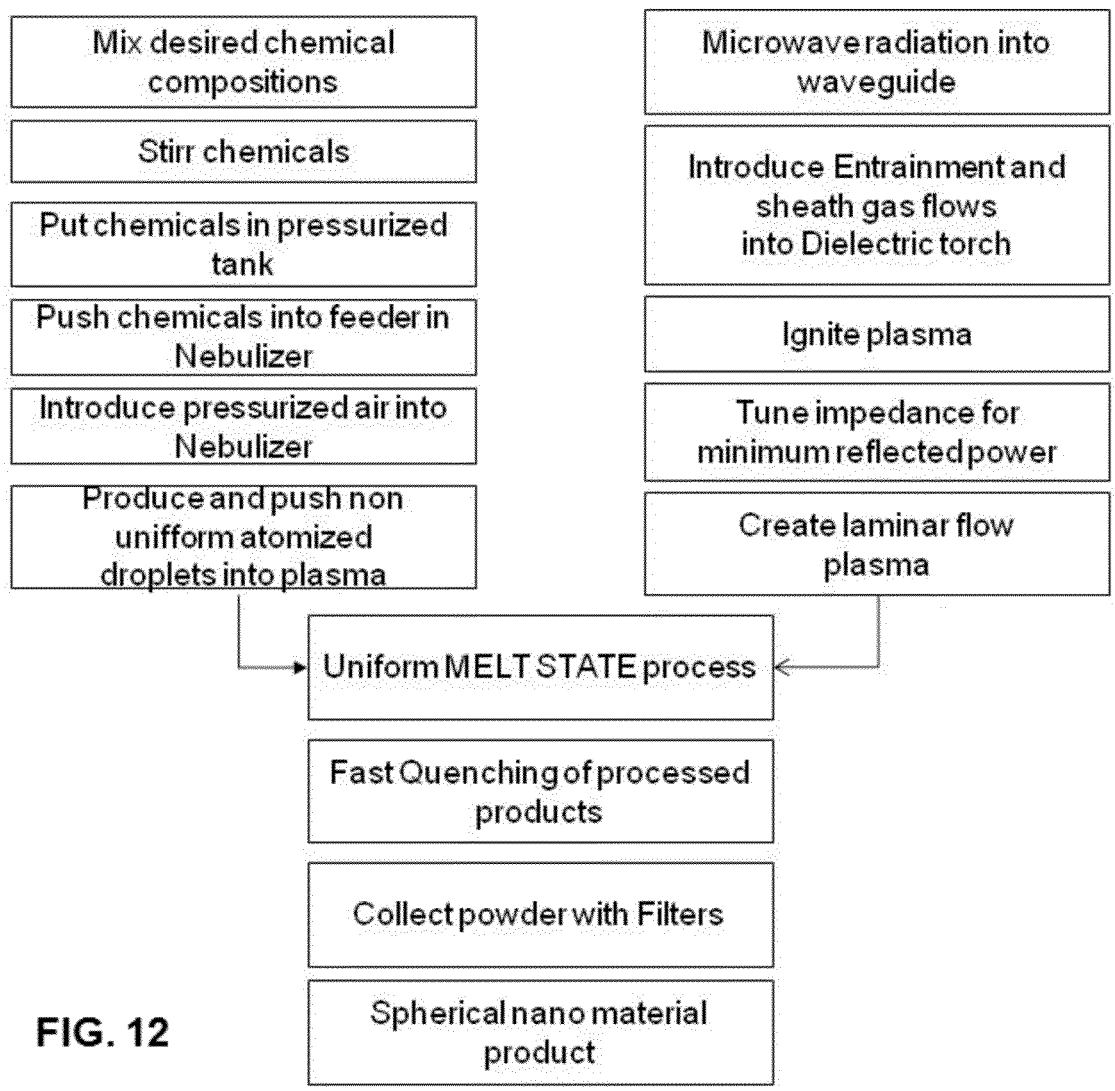
FIG. 12 illustrates a method of spheroidization by injection of a mist of droplets using a nebulizing nozzle.

Referring to FIG. 12, the figure illustrates a procedure to produce densified and spheroidized particles using solution droplets. The desired chemical composition is first mixed according to the assigned proportions of reactants. Subsequently it is thoroughly stirred to yield a homogenous molecular mix of reactants. The solution is then poured into a stainless steel tank. A pressurized source of air is used to inject air into the tank and push the solution towards an injector nozzle similar to a nebulizer, and injected into the central feeding tube of the nebulizer where it emerges as a jet. At the same time, another pressurized source is used to push air into an outer concentric tube of the nebulizer which penetrates the solution jet perpendicularly. Consequently this atomizes the jet into a mixture of droplets of different size diameters which are directed towards the plasma. Prior to this, referring to the right side of FIG. 12, the procedure to ignite the plasma is repeated as described in the paragraph referring to FIG. 11. Microwave radiation is introduced into the waveguide towards the plasma chamber where the dielectric plasma torch is located, and placed perpendicularly to the waveguide. Two annular flows are introduced; one for the entrainment of injected particles and the other flow to protect the inner wall of the outer tube of the plasma torch from melting under the effect of the high heat from the plasma. Once both flows are in place, the plasma is ignited inside the dielectric plasma torch. Adequate combination of entrainment and cooling flows are chosen to stabilize the plasma. Also, these flows are chosen so as to allow a smooth circulation of droplets towards the plasma and avoid turbulence that could create recirculation and back flow of powders above the hot zone of the plasma chamber, as well as avoiding a disruption in the thermal path. Once the droplets reach the plasma now present in the hot zone, they are subjected to a uniform melt state characterized by a uniform thermal path along with a uniform temperature profile of the plasma in the hot zone. The droplets are processed volumetrically and uniformly as solvent materials produced by oxidization and reduction reactions are burnt off. The processed particles exit into an atmospheric fast quenching chamber below the exit nozzle of the plasma. Upon solidification, the product is collected in filters, or in some applications quenched in distilled water, and analyzed for its microstructure and its mechanical, optical, and thermal properties.

Figure 13:
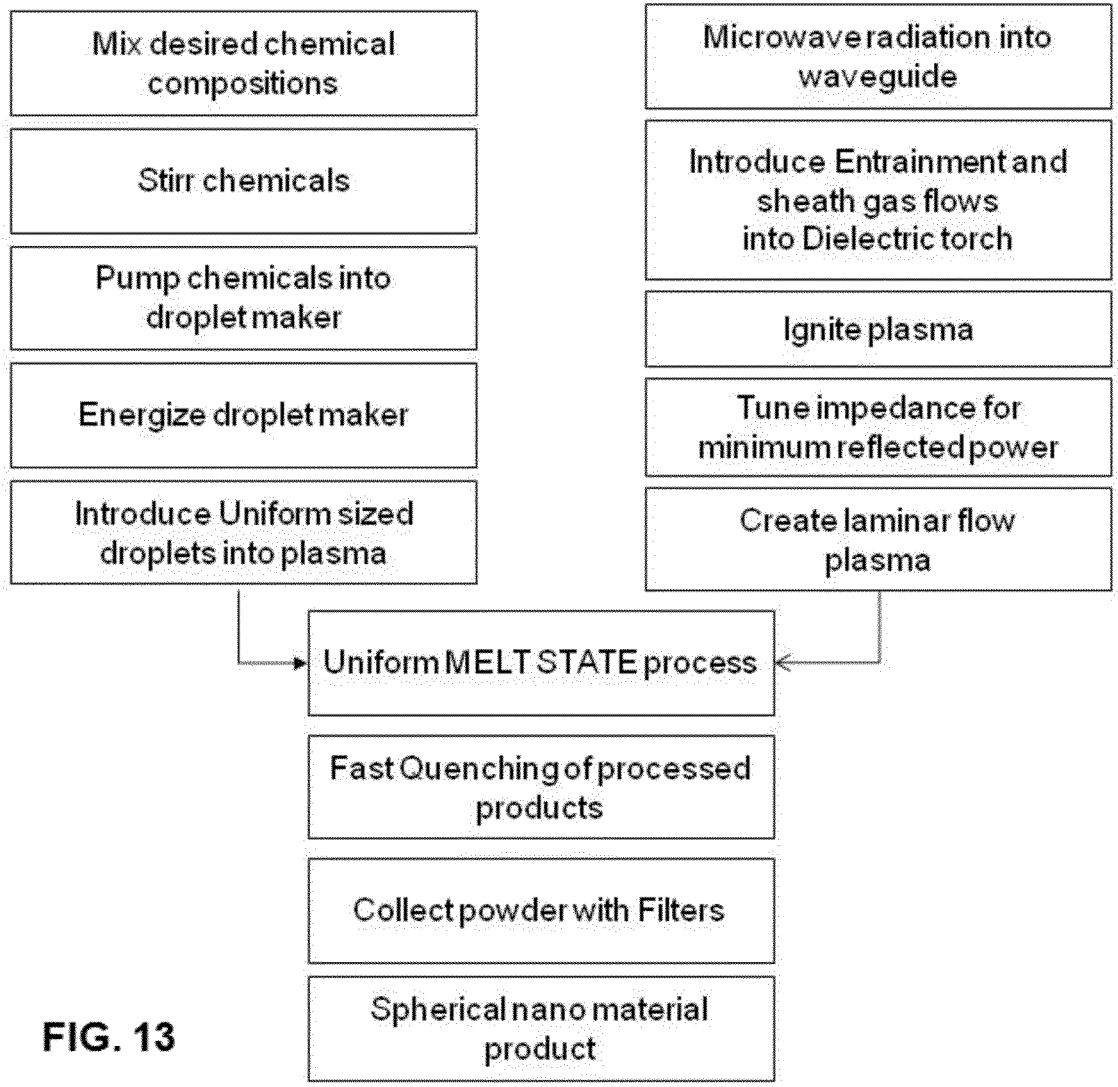
FIG. 13 illustrates a method of spheroidization by injection of a continuous stream of uniform droplets using a frequency driven droplet maker.

Referring to FIG. 13, the figure illustrates a procedure to produce densified and spheroidized particles using uniform solution precursor droplets produced using a droplet maker. The desired solution's chemical composition is prepared by first mixing the assigned proportions of reactants. Subsequently, the solution is thoroughly stirred to yield a homogenous molecular mix of reactants. The solution is then pumped inside the reservoir of a droplet maker by means of a peristaltic pump, or a pressurized tank. Once the reservoir is full, a piezo transducer is activated which impinges an adequate perturbation onto the liquid solution in the reservoir. Once the perturbation satisfies Rayleigh's breakdown law, the solution emerges through a capillary nozzle as a continuous stream of uniform droplets exiting at a constant speed for a given drive frequency of the piezo. The nature of the droplets stream is monitored so that it is not in a burst mode or incidental mode but in the form of a jet with uniform droplets. This stream of droplets is then injected into the feeding tube of the dielectric plasma torch where it undergoes the same plasma process, and subsequently is transformed into a collection of dense and spheroidized particles as described in the paragraphs referring to FIG. 11 and FIG. 12.

EXAMPLES

Example 1

Spheroidization of MgO—$Y_2O_3$ Spray Dried Particles

Referring to FIGS. 2A and 2B, this method has been applied to spheroidize particles made of commercial Magnesia-Yttria (MgO—$Y_2O_3$) solid powder particles obtained by the spray-drying technique from the Inframat Corporation. The densified and spheroidized particles exhibit a "pearl" like texture and morphology.

Example 2

Spheroidization of Atomized 7YSZ Solution Precursor

Figure 4:
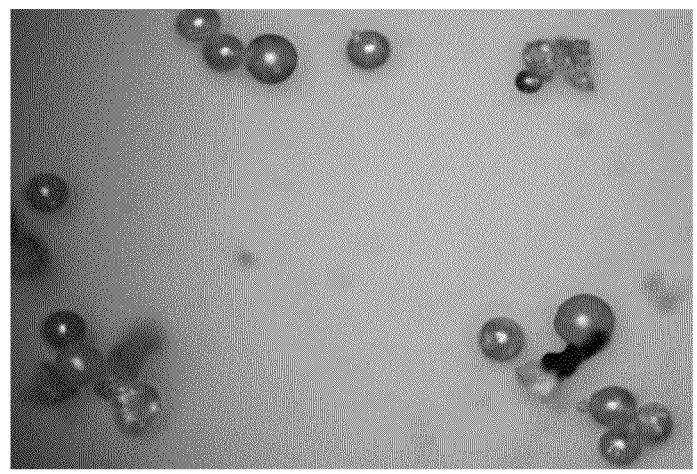
FIG. 4 illustrates densified and spheroidized 7% by weight $Y_2O_3$—$ZrO_2$ (7YSZ) ceramic particles, 20 to 38 micrometers in diameter after injection of 7YSZ precursor droplets using a nebulizing injector.
Figure 5:
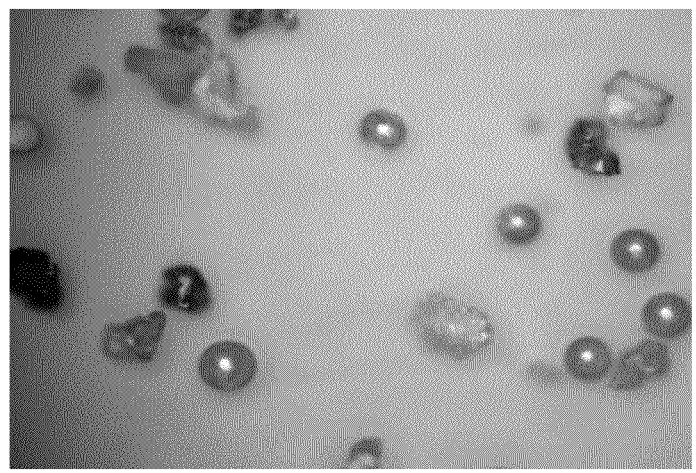
FIG. 5 illustrates densified and spheroidized 7YSZ ceramic particles, 38 to 53 micrometers in diameter after injection of 7YSZ precursor droplets using a nebulizing injector.

Referring to FIG. 4 and FIG. 5, this method has been applied to produce dense and spheroidized particles directly from the injection of atomized droplets of 7%-weight Yttria-Stabilized-Zirconia (7YSZ) solution precursor using a nebulizer.

Example 3

Spheroidized of a Stream Jet of Uniform Droplets of 8YSZ Solution Precursor

Figure 6:
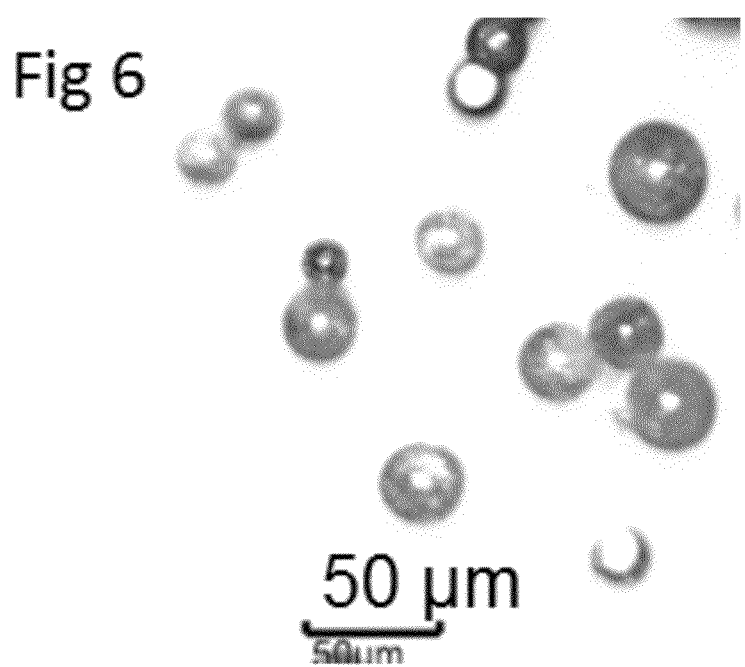
FIG. 6 illustrates densified and spheroidized 8YSZ ceramic particles, 15 to 35 micrometers in diameter after injection of 9YSZ precursor droplets using a droplet maker.
Figure 7:
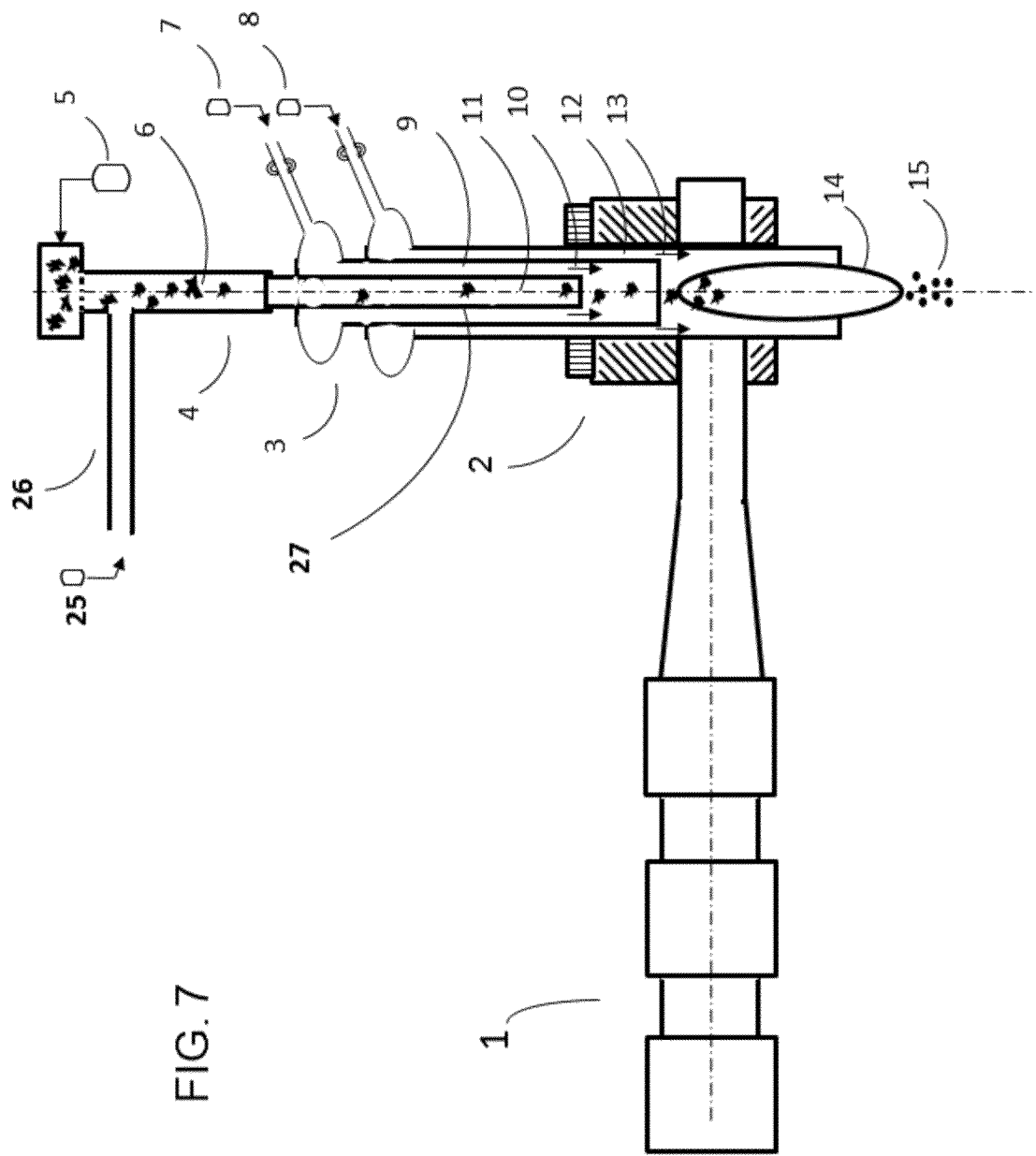
FIG. 7 illustrates a modified embodiment consisting of an additional process plasma gas to control the velocity of feed material and their residence time in the plasma zone.
Figure 8:
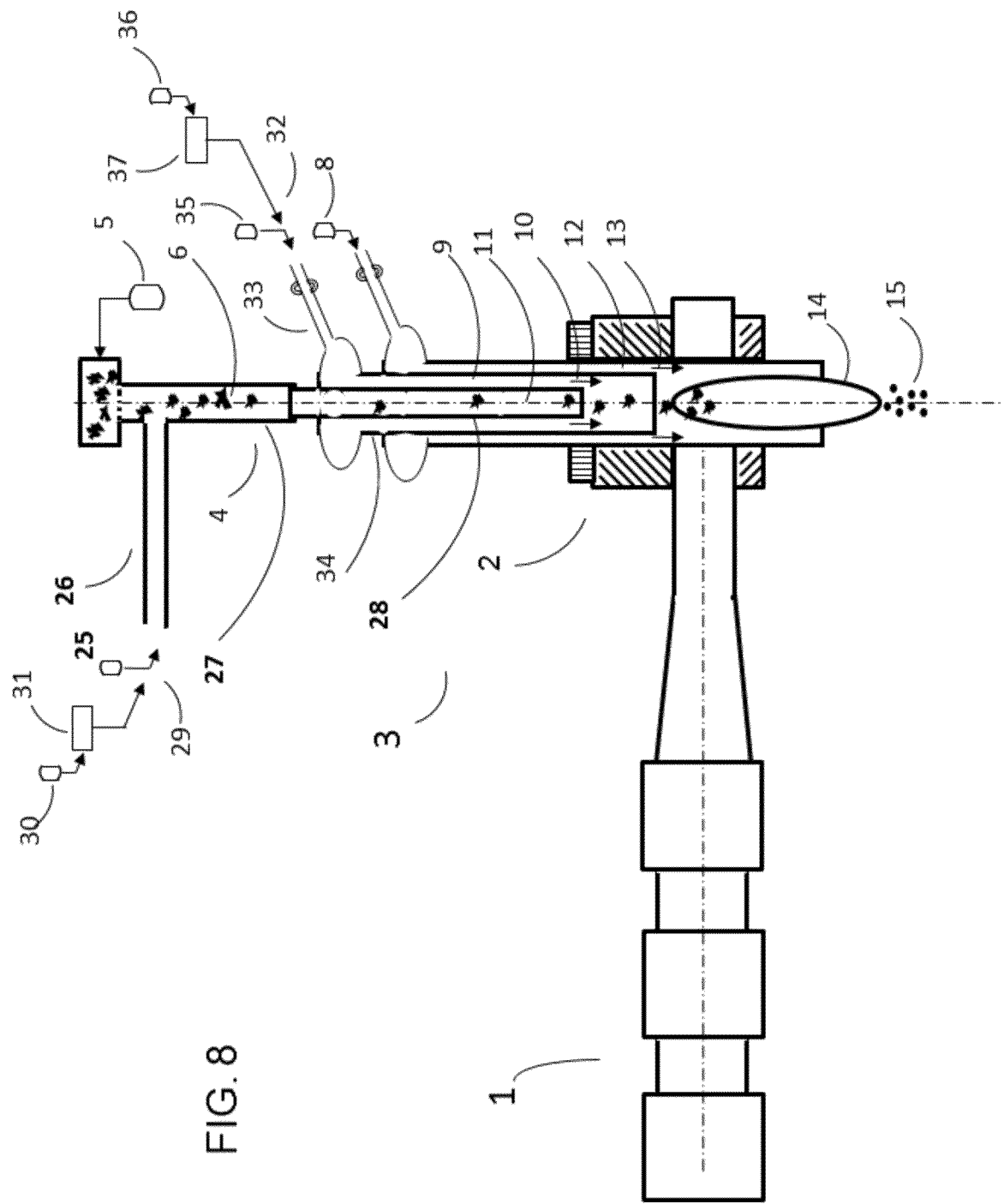
FIG. 8. Illustrates a modified embodiment consisting of adding a passivation feed material in the form of a gas or mist through the central tube or the middle tube of the plasma torch.
Figures 9A, 9B:
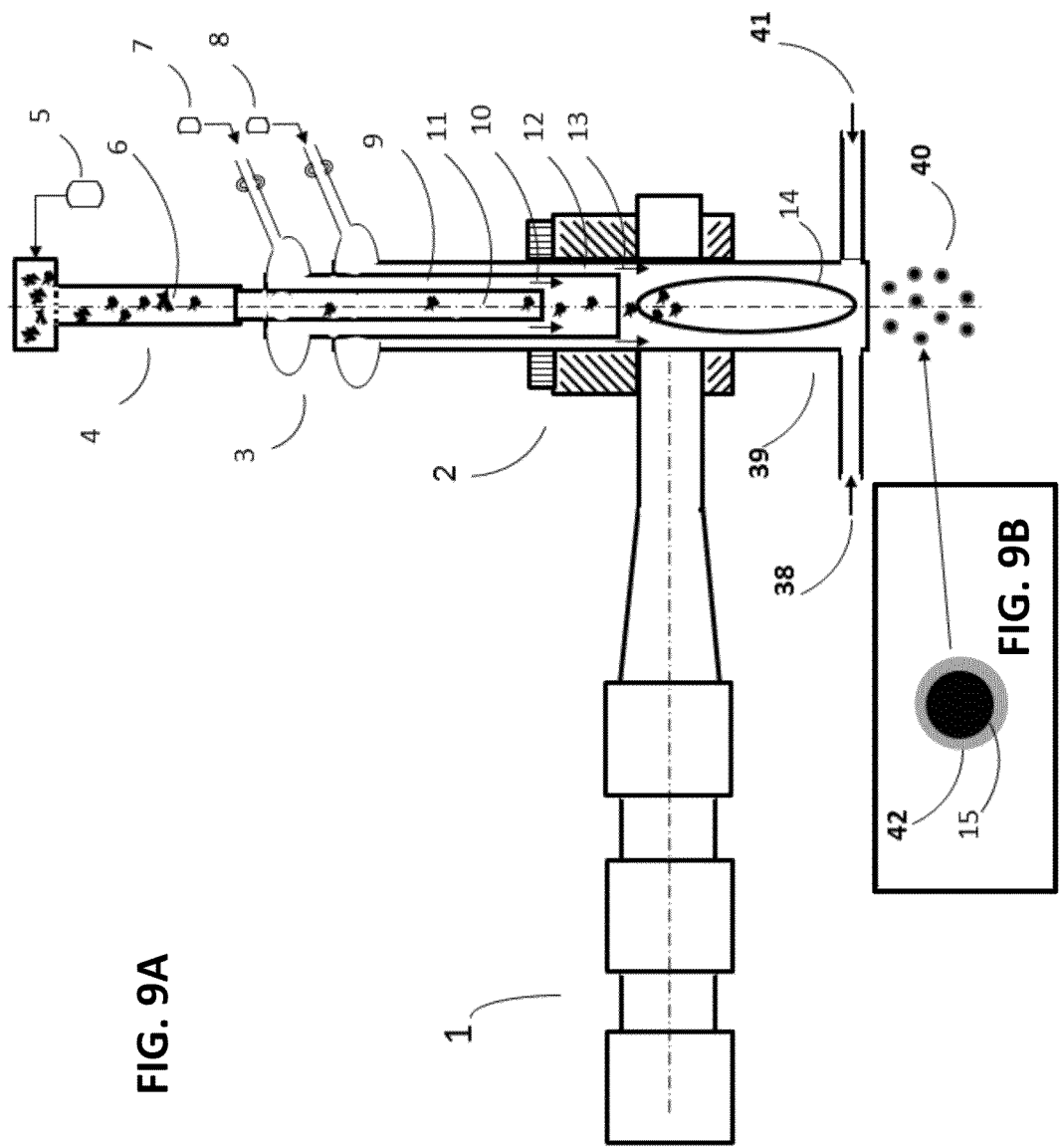
FIGS. 9A and 9B illustrate a modified embodiment consisting of the addition of one or many inlets to introduce passivation feed material to coat spheroidized product particles after the plasma zone.

Referring to FIG. 6, this method has been applied to produce dense and spheroidized particles directly from the injection of uniform droplets of 8%-weight Yttria-Stabilized-Zirconia (8YSZ) solution precursor using a high frequency piezo driven droplet maker.

Example 4

Spheroidization of Blended Alumina-titania Oxide ($Al_2O_3$-13$TiO_2$) and Cobalt Oxide (CoO) Powder Particles Referring to FIG. 10, this method has been applied to spheroidize particles made of a blend consisting of 80%-weight alumina-titania ($Al_2O_3$-13$TiO_2$) and 20%-weight cobalt oxide (CoO) agglomerated powder particles obtained by the spray-drying technique. The densified and spheroidized particles exhibit a "pearl" like texture and morphology.

What is claimed is:

1. A method of producing spheroidal and dense powder product particles extracted from plasma exhaust gas following injection of feed materials consisting of powder particles or solution precursor droplets using a microwave plasma and which method comprises:
   introducing axially feed material through a materials feeder into an axisymmetric microwave plasma torch;
   entraining said feed material using an axis-symmetric laminar entrainment flow;
   guiding said feed material towards the microwave plasma using an axis-symmetric laminar cooling flow;
   processing said feed material by exposing it to high temperature profile within the microwave generated plasma;
   filtering said exhaust gas of said microwave generated plasma; and
   extracting powder product particles from said filtered exhaust gas.

2. The method of claim 1 wherein said feed material is a powder with a substantially non-spherical shape.

3. The method of claim 1 wherein said feed material is a solution or a suspension of solution precursors injected as droplets.

4. The method of claim 1 wherein said materials feeder uses a fluidized bed.

5. The method of claim 1 wherein the materials feeder is a nebulizing atomizer which produces a mist of droplets having a diameter size ranging between 0.5 micrometers and 200 micrometers.

6. The method of claim 1 wherein the materials feeder is a droplet maker which uses a piezo electric transducer that injects uniform droplets.

7. The method of claim 1 wherein the filtering step includes filtering said plasma exhaust gas.

8. The method of claim 1 wherein the filtering step includes collecting powder product particles in water.

9. The method of claim 1 wherein the powder product particles are spherical.

10. The method of claim 1 wherein the powder product particles are densified to a range of 95% to 100%.

11. The method of claim 1 wherein the plasma gas is inert.

12. the method of claim 1 wherein said plasma gas has an additional component injected with said feeding material.

13. A method of producing passivated spheroidal and dense powder product particles extracted from plasma exhaust gas following injection of feed materials consisting of powder particles along with passivation material using a microwave plasma and which method comprises:
   introducing axially feed material through a materials feeder into an axisymmetric microwave plasma torch;
   entraining said feed material using an axis-symmetric laminar entrainment flow;
   guiding said feed material towards the microwave plasma using an axis-symmetric laminar cooling flow;
   introducing passivation material next to said feed material;
   processing said feed material and said passivation material in a uniform temperature profile within the microwave generated plasma;
   filtering said exhaust gas of said microwave generated plasma; and
   extracting powder product particles from said filtered exhaust gas.

14. The method of claim 13 wherein said passivation material is a material in a gaseous phase.

15. The method of claim 13 wherein said passivation material is an atomized liquid material.

16. The method of claim 13 wherein said product particles are spherical and have a shell-core structure.

17. The method of claim 16 wherein the core structure is made out of the feed material.

18. The method of claim 16 wherein the shell structure is made out of the passivation material.

19. A method of producing passivated spheroidal and dense powder product particles extracted from plasma exhaust gas following injection of feed materials consisting of powder particles along with passivation material using a microwave plasma and which method comprises:
   introducing axially feed material through a materials feeder into an axisymmetric microwave plasma torch;
   entraining said feed material using an axis-symmetric laminar entrainment flow;

guiding said feed material towards the microwave plasma using an axis-symmetric laminar cooling flow;

processing said feed material in a uniform temperature profile within the microwave generated plasma;

introducing said passivation material into plasma exhaust path downstream from microwave energy input;

filtering said exhaust gas of said microwave generated plasma; and extracting said coated powder product particles from said filtered exhaust plasma gas.

20. The method of claim 19 wherein said passivation material is a material in a gaseous phase.

21. The method of claim 19 wherein said passivation material is an atomized liquid material.

22. The method of claim 19 wherein said product particles are spherical and have a shell-core structure.

23. The method of claim 22 wherein the core structure is made out of the feed material.

24. The method of claim 22 wherein the shell structure is made out of the passivation material.

25. The method of claim 1 wherein the plasma gas is reducing.

26. The method of claim 1 wherein the plasma gas is oxidizing.

\* \* \* \* \*